(12) United States Patent
Daniel et al.

(10) Patent No.: US 12,073,414 B2
(45) Date of Patent: Aug. 27, 2024

(54) SYSTEM AND METHODS FOR IDENTIFYING AND TROUBLESHOOTING CUSTOMER ISSUES TO PREEMPT CUSTOMER CALLS

(71) Applicant: Capital One Services, LLC, McLean, VA (US)

(72) Inventors: Deny Daniel, Medford, MA (US); Lin Ni Lisa Cheng, New York, NY (US); Phoebe Atkins, Rockville, VA (US); Cruz Vargas, Alexandria, VA (US); Matthew Peroni, Bedford, MA (US); Rajko Ilincic, Annandale, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 35 days.

(21) Appl. No.: 17/403,160

(22) Filed: Aug. 16, 2021

(65) Prior Publication Data

US 2023/0047346 A1 Feb. 16, 2023

(51) Int. Cl.
*G06Q 30/016* (2023.01)
*G06N 3/08* (2023.01)

(52) U.S. Cl.
CPC ............. *G06Q 30/016* (2013.01); *G06N 3/08* (2013.01)

(58) Field of Classification Search
CPC ........ G06Q 30/016; G06N 3/08; G06N 3/098; G06N 3/09; H04M 3/5175; H04M 3/51; H04M 3/5183; H04M 3/5166; H04M 15/00; H04M 3/5191; H04M 3/523; H04M 3/493; H04M 3/5233; H04M 3/5232; H04M 3/42059; H04M 7/006; H04M 2201/40; H04M 3/42042; H04M 3/42221; H04M 3/436; H04M 3/42068; H04M 3/42; H04M 3/5238; H04M 3/5235; H04M 2242/22; H04M 3/5158; H04M 17/00; H04M 3/5141; H04M 3/5237; H04M 2203/551;
(Continued)

(56) References Cited

U.S. PATENT DOCUMENTS 6,411,687 B1 6/2002 Bohacek et al.
7,940,186 B2 5/2011 Aaron et al.
(Continued)

*Primary Examiner* — Fahd A Obeid
*Assistant Examiner* — Avia Salman
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a system that may receive an interaction message associated with an interaction a user has with an application or website, the interaction message may include an error message or a repeated action message. The system may identify, using a first machine learning model, one or more issues associated with the interaction message, retrieve one or more troubleshooting steps mapped to the one or more issues, and generate a first message comprising the one or more troubleshooting steps and a feedback request on an effectiveness of the one or more troubleshooting steps. The system may transmit the first message to the user, receive feedback from the user in response to the feedback request, and determine whether the feedback is negative. When the feedback is negative, the system may transmit a second message to a representative requesting the representative call the user.

20 Claims, 6 Drawing Sheets

(58) Field of Classification Search
CPC ........... H04M 3/4936; H04M 2215/32; H04M 3/2218; H04M 3/533; H04M 2207/12; H04M 3/5231; H04M 3/4931; H04M 3/2281; H04M 3/56; H04M 3/4228; H04M 3/527; H04M 7/12; H04M 7/003; H04M 3/54; H04M 3/36; H04M 2207/18; H04M 3/42153; H04M 3/42102; H04M 3/382; H04M 15/41; H04M 3/42323; H04M 15/58; H04M 3/5133; H04M 15/80; H04M 2201/38; H04M 2201/60; H04M 3/42382; H04M 15/43; H04M 2201/42; H04M 15/68; H04M 2203/2011; H04M 15/44; H04M 15/51; H04M 2203/402; H04M 3/4938; H04M 3/38; H04M 3/4878; H04M 15/8044; H04M 3/42195; H04M 15/90; H04M 2201/18; H04M 2215/016; H04M 15/8083; H04M 2203/401; H04M 3/5125; H04M 1/72403; H04M 15/745; H04M 3/58; H04M 15/83; H04M 1/57; H04M 2215/2026; H04M 2215/0196; H04M 2215/0104; H04M 15/06; H04M 3/42161; H04M 2215/54; H04M 2215/0108; H04M 3/42229; H04M 15/47; H04M 2203/558; H04M 15/49; H04M 2242/30; H04M 2215/0164; H04M 2203/6045; H04M 3/487; H04M 15/08; H04M 1/2535; H04M 7/00; H04M 3/42314; H04M 15/56; H04M 2215/46; H04M 2203/2072; H04M 17/20; H04M 2242/04; H04M 7/0027; H04M 2215/42; H04M 3/42348; H04M 2215/745; H04M 2215/0188; H04M 3/42017; H04M 3/48; H04M 3/42008; H04M 15/854; H04M 2203/556; H04M 3/4211; H04M 3/44; H04M 3/2227; H04M 2203/6027; H04M 3/42365; H04M 15/85; H04M 2203/408; H04M 2215/0168; H04M 2201/36; H04M 15/765; H04M 7/128; H04M 3/428; H04M 2203/2038; H04M 2203/4933; H04M 11/04; H04M 3/50; H04M 7/0075; H04M 2215/0148; H04M 7/0057; H04M 17/02; H04M 3/02; H04M 3/537; H04M 3/42093; H04M 17/100024; H04M 15/09; H04M 7/0033; H04M 2203/301; H04M 2203/357; H04M 2215/202; H04M 1/2757; H04M 2203/555; H04M 15/77; H04M 3/42144; H04M 3/42178; H04M 15/88; H04M 2203/2016; H04M 2215/0192; H04M 1/72445; H04M 15/55; H04M 3/46; H04M 2201/14; H04M 2203/651; H04M 2203/254; H04M 15/8033; H04M 3/465; H04M 3/53308; H04M 2203/6054; H04M 11/06; H04M 2203/403; H04M 3/4217; H04M 2215/82; H04M 3/5234; H04M 2201/39; H04M 2215/8166; H04M 2203/6081; H04M 7/0078; H04M 1/72457; H04M 2215/34; H04M 17/204; H04M 2215/7442; H04M 3/42136; H04M 2203/404; H04M 2215/7254; H04M 3/42357; H04M 2207/203; H04M 7/126; H04M 3/42297; H04M 2203/6072; H04M 7/0045; H04M 2203/252; H04M 15/7655; H04M 2201/12; H04M 3/367; H04M 3/53333; H04M 15/7652; H04M 15/8016; H04M 2215/724; H04M 3/2254; H04M 1/72406; H04M 7/0036; H04M 1/656; H04M 3/42263; H04M 15/852; H04M 2203/306; H04M 3/00; H04M 15/772; H04M 7/0054; H04M 3/42204; H04M 2203/552; H04M 2203/655; H04M 2215/70; H04M 2215/8108; H04M 7/129; H04M 1/72415; H04M 11/08; H04M 3/42238; H04M 7/0009; H04M 15/67; H04M 2215/00; H04M 2215/208; H04M 3/5108; H04M 1/72418; H04M 2203/5009; H04M 2203/5063; H04M 2203/654; H04M 17/106; H04M 2017/14; H04M 2215/7268; H04M 3/301; H04M 17/201; H04M 2203/559; H04M 2215/56; H04M 2215/8158; H04M 1/72433; H04M 1/72439; H04M 15/75; H04M 15/785; H04M 15/86; H04M 2250/12; H04M 1/66; H04M 15/8221; H04M 2203/352; H04M 2215/0112; H04M 2215/7245; H04M 2215/8162; H04M 11/022; H04M 2242/12; H04M 3/10; H04M 3/304; H04M 3/4874; H04M 7/1275; H04M 1/27; H04M 2250/22; H04M 15/8005; H04M 15/8011; H04M 3/24; H04M 2017/22; H04M 2215/7277; H04M 3/42272; H04M 3/4281; H04M 7/1225; H04M 15/857; H04M 2215/204; H04M 1/2749; H04M 2215/7295; H04M 7/122; H04M 1/006; H04M 1/72427; H04M 2207/08; H04M 2215/72; H04M 7/0039; H04M 1/05; H04M 1/27475; H04M 15/42; H04M 2201/405; H04M 2203/205; H04M 2215/48; H04M 2215/7833; H04M 3/306; H04M 3/515; H04M 1/72505; H04M 15/8022; H04M 17/35; H04M 2250/04; H04M 2250/52; H04M 3/007; H04M 3/53341; H04M 1/72502; H04M 2203/255; H04M 2203/553; H04M 3/229; H04M 3/5315; H04M 2203/258; H04M 3/305; H04M 3/548; H04M 7/121; H04M 1/00; H04M 1/82; H04M 2203/353; H04M 2203/5054; H04M 2250/10; H04M 3/16; H04M 3/4283; H04M 3/541; H04M 1/6033; H04M 1/72409; H04M 15/8027; H04M 2207/45; H04M 2215/01; H04M 2215/2033; H04M 2215/7045; H04M 7/1215; H04M 1/27457; H04M 7/0081; H04M 1/642; H04M 2203/1066; H04M 2215/7806; H04M 2250/14; H04M 15/842; H04M 1/573; H04M 11/007; H04M 15/39; H04M 15/723; H04M 15/8207; H04M 2201/22; H04M 2215/7407; H04M 3/005; H04M 3/564; H04M 2017/2593; H04M 5/00; H04M 7/0096; H04M 7/127; H04M 15/04; H04M 15/774; H04M 2203/154; H04M 7/0093; H04M 1/675; H04M 11/045; H04M 15/8355; H04M 2215/2006; H04M 2250/02; H04M 15/8066; H04M 2242/18; H04M 3/308; H04M 7/0051; H04M 7/0066; H04M 15/8353; H04M 2250/62; H04M 3/42025; H04M 3/565; H04M 17/206; H04M 2215/68; H04M 3/52;

H04M 1/275; H04M 1/65; H04M 15/12;
H04M 2203/1008; H04M 3/5335; H04M
1/665; H04M 15/54; H04M 15/64; H04M
15/725; H04M 15/771; H04M 15/848;
H04M 2203/554; H04M 7/0072; H04M
17/208; H04M 2203/351; H04M 3/42246;
H04M 3/546; H04M 1/27463; H04M
2203/053; H04M 2203/2077; H04M
2242/08; H04M 15/715; H04M 15/888;
H04M 2017/26; H04M 2203/305; H04M
2215/782; H04M 2215/8104; H04M
2242/16; H04M 2250/06; H04M 3/242;
H04M 9/00; H04M 1/2471; H04M 1/253;
H04M 1/72463; H04M 15/7556; H04M
17/205; H04M 2203/2094; H04M
2207/185; H04M 2242/28; H04M 1/2477;
H04M 1/26; H04M 1/67; H04M 1/673;
H04M 1/72421; H04M 1/72513; H04M
15/858; H04M 17/026; H04M 2201/10;
H04M 3/569; H04M 2017/241; H04M
2203/1016; H04M 2203/1025; H04M
2215/28; H04M 2215/8154; H04M
2215/96; H04M 3/247; H04M 3/362;
H04M 3/42076; H04M 3/42331; H04M
3/53391; H04M 1/72424; H04M 1/72442;
H04M 15/78; H04M 15/82; H04M
15/882; H04M 2201/34; H04M 2201/52;
H04M 2203/5027; H04M 3/085; H04M
3/40; H04M 7/0087; H04M 1/50; H04M
1/677; H04M 1/72466; H04M 15/735;
H04M 15/74; H04M 17/207; H04M
2215/7813; H04M 2242/06; H04M 15/24;
H04M 15/881; H04M 2215/7281; H04M
2215/8133; H04M 3/002; H04M 1/0202;
H04M 1/2155; H04M 17/202; H04M
2017/25; H04M 2203/203; H04M
2203/4581; H04M 3/64; H04M 1/658;
H04M 2017/243; H04M 3/53358; H04M
3/53375; H04M 19/02; H04M 2203/2083;
H04M 2250/58; H04M 2250/68; H04M
11/085; H04M 15/751; H04M 2203/557;
H04M 2215/14303; H04M 1/23; H04M
1/7381; H04M 2207/14; H04M
2207/2746; H04M 1/6091; H04M
1/724634; H04M 15/8088; H04M
2203/152; H04M 2203/4563; H04M
2215/8112; H04M 2250/64; H04M
2203/1041; H04M 2215/7464; H04M
2215/8183; H04M 2250/66; H04M
7/0015; H04M 1/0293; H04M 1/21;
H04M 1/2475; H04M 1/652; H04M
11/025; H04M 15/885; H04M 2203/658;
H04M 2215/2073; H04M 2215/7471;
H04M 3/2245; H04M 3/42119; H04M
7/14; H04M 1/2747; H04M 1/2755;
H04M 1/60; H04M 1/667; H04M 1/80;
H04M 15/16; H04M 17/023; H04M
2203/257; H04M 2207/30; H04M
2215/7213; H04M 2215/7421; H04M
2242/00; H04M 3/365; H04M 7/066;
H04M 7/1265; H04M 9/02; H04M
1/27467; H04M 1/651; H04M 1/68;
H04M 1/724098; H04M 1/724631; H04M
1/72475; H04M 15/65; H04M 15/783;
H04M 15/8257; H04M 15/855; H04M
15/863; H04M 19/048; H04M 19/08;
H04M 2201/26; H04M 2203/1083; H04M
2203/30; H04M 2203/4554; H04M
2215/146; H04M 2215/786; H04M
2215/8179; H04M 3/307; H04M 7/0018;
H04M 1/0287; H04M 1/505; H04M
15/18; H04M 15/8271; H04M 15/883;
H04M 2017/246; H04M 2203/354; H04M
1/727; H04M 17/005; H04M 19/008;
H04M 2203/05; H04M 2203/1033; H04M
2203/5072; H04M 2207/40; H04M
2215/014; H04M 2215/2093; H04M
2215/24; G10L 15/26; G10L 15/22; G10L
25/63; G10L 15/1822; G10L 2015/223;
G10L 15/063; G10L 15/30; G10L 17/00;
G10L 15/1815; G10L 2015/088; G10L
15/02; G10L 15/08; G10L 25/51; G10L
15/16; G10L 13/00; G10L 17/04; G10L
17/22; G10L 25/48; G10L 17/02; G10L
17/26; G10L 15/04; G10L 15/18; G10L
17/06; G10L 15/183; G10L 25/30; G10L
15/00; G10L 2015/228; G10L 2015/225;
G10L 25/78; G10L 13/08; G10L 15/19;
G10L 25/60; G10L 13/02; G10L 15/32;
G10L 15/01; G10L 21/00; G10L 25/90;
G10L 2015/025; G10L 25/87; G10L
17/24; G10L 17/18; G10L 15/06; G10L
15/10; G10L 2015/0631; G10L 21/0272;
G10L 13/027; G10L 25/03; G10L 17/08;
G10L 25/24; G10L 13/033; G10L 15/005;
G10L 15/1807; G10L 2015/0635; G10L
25/27; G10L 15/187; G10L 15/14; G10L
21/0208; G10L 15/197; G10L 2015/227;
G10L 25/18; G10L 15/065; G10L 15/142;
G10L 2015/0638; G10L 15/193221;
G10L 21/02; G10L 15/28; G10L 17/16;
G10L 25/72; G10L 2021/0135; G10L
15/34; G10L 2015/02754; G10L 15/285;
G10L 25/93; G10L 13/04; G10L 19/018;
G10L 15/25; G10L 21/0216; G10L
13/047; G10L 17/10; G10L 2015/226;
G10L 19/00; G10L 15/144; G10L
21/0232; G10L 25/06; G10L 25/45; G10L
21/003; G10L 21/12; G10L 2015/086;
G10L 2021/02087; G10L 21/013; G10L
19/0204; G10L 19/265; G10L 2025/906;
G10L 2021/02166; G10L 21/16; G10L
15/075; G10L 19/038; G10L 19/167;
G10L 19/22; G10L 19/24; G10L 19/26;
G10L 21/007; G10L 25/12; G10L 25/39;
G10L 25/81; G10L 15/24; G10L 19/008;
G10L 19/16; G10L 2025/937; G10L
21/0264; G10L 21/0308; G10L 25/57;
G10L 13/06; G10L 15/148; G10L 19/002;
G10L 19/005; G10L 2015/022; G10L
2015/0633; G10L 2015/081; G10L
2021/065; G10L 21/0316; G10L 19/032;
G10L 19/173; G10L 2019/0005; G10L
2021/02168; G10L 21/04; G10L 21/055;
G10L 21/14; G01N 35/0099; G01N
35/00871; G01N 2035/00881; G01N
35/04; G01N 2035/0425; G01N
2035/0475; G01N 35/1002; G01N
2035/00356; G01N 33/48792; G01N
33/543; G01N 11/16; G01N 2009/006;

G01N 2011/0006; G01N 2011/0013; G01N 2011/002; G01N 2035/009; G01N 2291/02818; G01N 29/036; G01N 29/326; G01N 29/4436; G01N 9/002; G01N 9/10; G01N 9/36; G01N 33/53; G01N 35/10; G01N 9/00; G01N 2333/4706; G01N 35/00732; G01N 15/1433; G01N 1/2273; G01N 15/01; G01N 15/0227; G01N 15/0612; G01N 15/1434; G01N 2001/2276; G01N 2015/1493; G01N 2015/1497; G01N 2001/245; G01N 2015/1486; G01N 33/4925; G01N 2035/00643; G01N 2035/00801; G01N 2035/0467; G01N 2035/0477; G01N 35/00623; G01N 2035/00831; G01N 2035/00861; G01N 2035/0465; G01N 2035/1032; G01N 35/0092; G01N 2001/021; G01N 2001/2223; G01N 2035/00158; G01N 2035/1025; G01N 35/028; G01N 35/1009; G01N 1/2214; G01N 2001/2833; G01N 2035/00653; G01N 2035/103; G01N 21/84; G01N 25/20; G01N 27/02; G01N 33/4972; G01N 35/00712

See application file for complete search history.

(56)  References Cited

U.S. PATENT DOCUMENTS

| | | |
|---|---|---|
| 9,014,365 B1 | 4/2015 | Castiglione |
| 2015/0317676 A1* | 11/2015 | Reid .................. G06Q 30/0255 705/14.53 |
| 2016/0239848 A1* | 8/2016 | Chang .................. G06Q 30/016 |
| 2018/0247347 A1* | 8/2018 | McNabb ............. G06F 11/3055 |
| 2019/0347668 A1* | 11/2019 | Williams ............... G06N 5/046 |
| 2021/0248607 A1* | 8/2021 | Yerradoddi .......... G06Q 20/407 |
| 2022/0330050 A1* | 10/2022 | Osinski .................... G06N 5/01 |
| 2022/0343250 A1* | 10/2022 | Tremblay ........... G06Q 10/0633 |

* cited by examiner

SYSTEM AND METHODS FOR IDENTIFYING AND TROUBLESHOOTING CUSTOMER ISSUES TO PREEMPT CUSTOMER CALLS

FIELD

The disclosed technology relates to systems and methods for identifying and troubleshooting customer issues to preempt customer calls. In particular, the disclosed technology relates to systems and methods for automatically detecting customer issues, proactively troubleshooting the customer issues before the customer places a call to a customer service center or merchant, and selectively routing or escalating the customer issue to an appropriate call center or other merchant representative.

BACKGROUND

While organizations commonly provide a call center to assist customers with issues with products, services, payments, etc., call center representatives are frequently bogged down with high volumes of common issues that are easy to resolve. This results in long wait times for all customers, but also leaves customers with more complicated issues no options other than to wait or call back another time in hopes of reaching the call center. Hiring additional call center representative can be a very expensive endeavor. Thus, organizations need a way to offload common issues from call center representatives thereby preempting calls as well as escalate more complicated issues.

Accordingly, there is a need for improved customer service systems that preempt customer calls to call centers representatives as well as escalate repeated customer issues that are not easily resolved. Embodiments of the present disclosure are directed to this and other considerations.

SUMMARY

Disclosed embodiments may include a system for identifying and troubleshooting customer issues to preempt customer calls. The system may include one or more processors, and memory in communication with the one or more processors and storing first instructions that are configured to cause the system to perform a method for identifying and troubleshooting customer issues to preempt customer calls. For example, the system (e.g., troubleshooting system 420) may receive an (e.g., automated) interaction message associated with an interaction a user has with an application or website, the interaction message comprising an error message or a repeated action message and identify, using a first machine learning model (e.g., neural network), one or more issues associated with the interaction message. The system (e.g., troubleshooting system 420) may update an occurrence rate based on identifying the one or more issues, the occurrence rate reflecting a percentage of interaction messages being associated with the one or more issues over a predetermined period.

The system (e.g., troubleshooting system 420) may also determine whether the occurrence rate exceeds a predetermined threshold. When the occurrence rate exceeds the predetermined threshold, the system (e.g., troubleshooting system 420) may generate a first message (e.g., an email or chat message (e.g., via Slack)) with information regarding the one or more issues and requesting a technical team to investigate and resolve the one or more issues, transmit the first message to the technical team, generate a second message (e.g., an email, text (SMS) message, a textual chat session message, or push notification) for the user indicating that the technical team is working on the one or more issues, and transmit the second message to the user (e.g., via user device 502). When the occurrence rate does not exceed the predetermined threshold, the system (e.g., troubleshooting system 420) may retrieve (e.g., from database 460 and/or 516) one or more troubleshooting steps mapped to the one or more issues, generate a third message (e.g., an email, text (SMS) message, a textual chat session message, or push notification) including the one or more troubleshooting steps and a feedback request on an effectiveness of the one or more troubleshooting steps, and transmit the third message to the user (e.g., via user device 502).

Further, the system (e.g., troubleshooting system 420) may receive feedback from the user in response to the feedback request and determine whether the feedback is negative. When the feedback is negative, the system (e.g., troubleshooting system 420) may transmit a fourth message (e.g., an email or chat message (e.g., via Slack)) to a representative requesting the representative call the user.

Disclosed embodiments may include a system for identifying and troubleshooting customer issues to preempt customer calls. The system may include one or more processors, and memory in communication with the one or more processors and storing first instructions that are configured to cause the system to perform a method for identifying and troubleshooting customer issues to preempt customer calls. For example, the system (e.g., troubleshooting system 420) may receive an (e.g., automated) interaction message associated with an interaction a user has with an application or website, the interaction message including an error message or a repeated action message. The system (e.g., troubleshooting system 420) may identify, using a first machine learning model (e.g., neural network), one or more issues associated with the interaction message and retrieve (e.g., from database 460 and/or 516) one or more troubleshooting steps mapped to the one or more issues. The system (e.g., troubleshooting system 420) may generate a webpage for the user, generate a first message (e.g., an email, text (SMS) message, a textual chat session message, or push notification) including the one or more troubleshooting steps and a link to the webpage, transmit the first message to the user (e.g., via user device 502), receive feedback from the user regarding an effectiveness of the one or more troubleshooting steps via the webpage, and determine whether the feedback is negative. When the feedback is negative, the system (e.g., troubleshooting system 420) may transmit a second message (e.g., an email or chat message (e.g., via Slack)) to a representative requesting a representative call the user.

Disclosed embodiments may include a system for identifying and troubleshooting customer issues to preempt customer calls. The system may include one or more processors, and memory in communication with the one or more processors and storing first instructions that are configured to cause the system to perform a method for identifying and troubleshooting customer issues to preempt customer calls. For example, the system (e.g., troubleshooting system 420) may receive an (e.g., automated) interaction message associated with an interaction a user has with an application or website, the interaction message may include an error message or a repeated action message. The system (e.g., troubleshooting system 420) may identify, using a first machine learning model (e.g., a neural network), one or more issues associated with the interaction message, retrieve (e.g., from database 460 and/or 516) one or more troubleshooting steps mapped to the one or more issues, and generate a first message comprising the one or more troubleshooting steps and a feedback request on an effectiveness of the one or more troubleshooting steps. The system (e.g., troubleshooting system 420) may transmit the first message (e.g., an email, text (SMS) message, a textual chat session message, or push notification) to the user (e.g., via user device 502), receive feedback from the user in response to the feedback request, and determine whether the feedback is negative. When the feedback is negative, the system (e.g., troubleshooting system 420) may transmit a second message to a representative requesting the representative call the user.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure relate to systems and methods for identifying and troubleshooting customer issues to preempt calls. In particular, the disclosed technology relates to automatically escalating a user issue to a technical team when the occurrence of the issue the user is experiencing exceeds a predetermined threshold and automatically providing a user with troubleshoot steps when the occurrence does not exceed a threshold and escalating the user's issue to a call center representative when user reports that troubleshooting steps are ineffective. The systems and methods described herein are necessarily rooted in computer and technology as they relate to automatically identifying a customer's one or more issues before the customer calls and based on receiving an interaction message. In some instances, the system utilizes a machine learning model to determine the one or more customer issues based on receiving an interaction message. Machine learning models are a unique computer technology that involves training the models to complete tasks, such as labeling, categorizing, identifying, or determining whether a customer's interaction message (e.g., repeated tapping a link within an application or a error message) is associated with one or more particular customer issues so the one or more machine learning models learn how to label, categorize, identify, or determine one or more issues based on received interaction message. Importantly, examples of the present disclosure improve the speed with which computers can determine a customer issue and, based on the identified customer issue provide the customer with relevant troubleshooting instructions prior to the customer calling a customer representative or escalating the issue to a technical team is the issue occurs frequently enough.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1A:
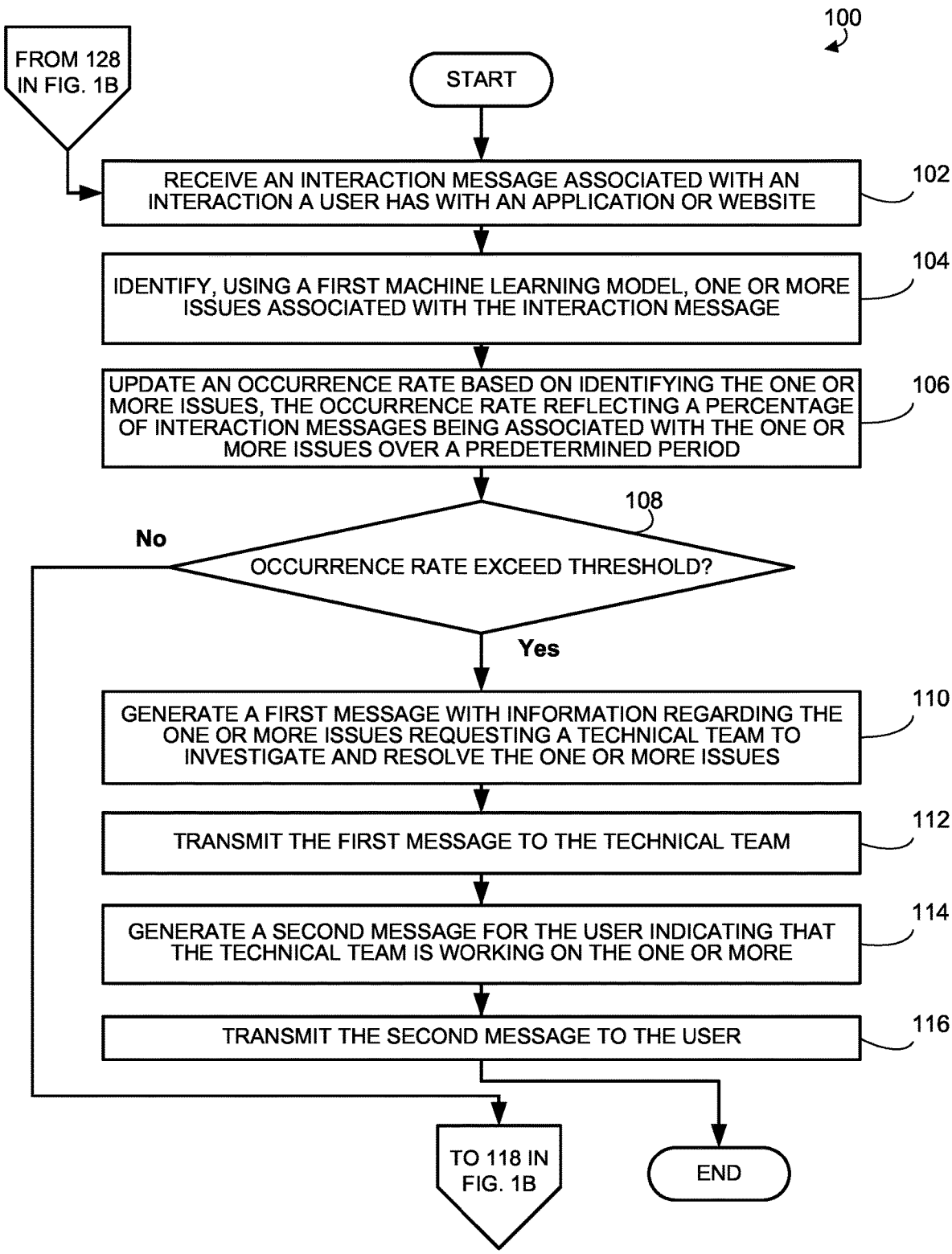
FIGS. 1A and 1B are flow diagrams illustrating an exemplary method for identifying and troubleshooting customer issues to preempt customer calls, in accordance with certain embodiments of the disclosed technology.
Figure 1B:
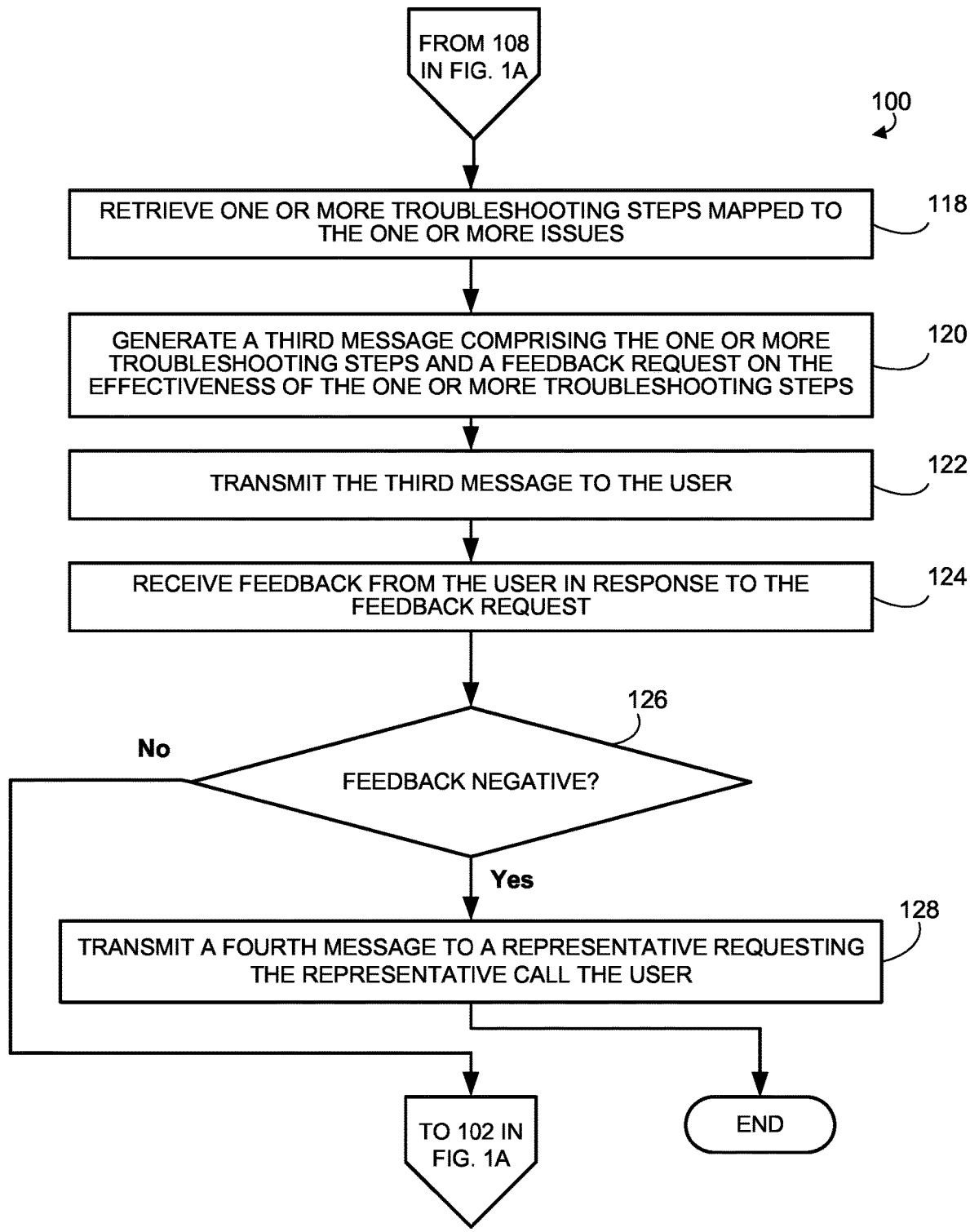

FIGS. 1A and 1B are flow diagrams illustrating an exemplary method 100 for identifying and troubleshooting customer issues to preempt calls, in accordance with certain embodiments of the disclosed technology. The steps of method 100 may be performed by one or more components of the system 500 (e.g., troubleshooting system 420 or web server 510 of user contact system 508 or user device 502), as described in more detail with respect to FIGS. 4 and 5. Although method 100 is described as being performed by the troubleshooting system 420, the user device 502 may perform similar steps, or some hybrid approach.

In block 102, the troubleshooting system 420 may receive an interaction message associated with an interaction a user has with an application or website. The interaction message may include an error message or a repeated action message. The error message may be an error message generated by a mobile application. The repeated action message may be in response to a user repeatedly trying to click a button or link such as a complete money transfer but being unable to do so.

In block 104, the troubleshooting system 420 may identify, using a first machine learning model, one or more issues associated with the interaction message. The first machine learning model may be a neural network. In some embodiments, the troubleshooting system may train the first machine learning model by feeding the first machine learning model interaction messages labeled with one or more associated issues so that the first machine learning model learns to associate certain interaction messages with common issues. After the first machine learning model is provided a threshold number of interaction messages and associated issues, the first machine learning model may be used for receiving a non-labeled interaction message as in block 102. Again, block 104 may be performed by the user device 502 or a combination of the troubleshooting system 420 and the user device 502. If a hybrid approach is used, federated learning may be employed to keep the majority of the data on the user device 502 and only upload model weights to the server.

In block 106, the troubleshooting system 420 may update an occurrence rate based on identifying the one or more issues, the occurrence rate reflecting a percentage of interaction messages being associated with the one or more issues over a predetermined period.

In block 108, the troubleshooting system 420 may determine whether the occurrence rate exceeds a predetermined threshold. When the troubleshooting system 420 determines that the occurrence rate exceeds the predetermined threshold, the troubleshooting system 420 may proceed in method 100 to block 110. When the troubleshooting system 420 determines that the occurrence rate does not exceed the predetermined threshold, the troubleshooting system 420 may proceed in method 100 to block 118 (shown in FIG. 1B).

In block 110, the troubleshooting system 420 may generate a first message with information regarding the one or more issues and requesting a technical team to investigate and resolve the one or more issues. For example, the technical team may be a group of information technology analyst assigned to troubleshooting escalated issues (e.g., issues that enough users are experiencing).

In block 112, the troubleshooting system 420 may transmit the first message to the technical team. The first message may be sent via an email, a push notification, a text message, a chat message, or combinations thereof.

In block 114, the troubleshooting system 420 may generate a second message for the user indicating that the technical team is working on the one or more issues.

In block 116, the troubleshooting system 420 may transmit the second message to the user. The second message may be sent via an email, a push notification, a text message, a chat message, or combinations thereof.

In block 118, the troubleshooting system 420 may retrieve one or more troubleshooting steps mapped to the one or more issues. For example, in troubleshooting database 460 or database 516, the troubleshooting system 420 may have stored a list with one or more issues mapped to one or more troubleshooting steps so that the troubleshooting system may look up the predetermined troubleshooting steps associated with the one or more issues. As an example, the troubleshooting system 420 may retrieve a force quit set of troubleshooting steps. The force quit troubleshooting steps may include instructions to force quit the application via Operating System specific instructions for their device (e.g., double click the home button then swipe the application up to force quit on Apple™ iOS™). As another example, the troubleshooting system 420 may retrieve an application update set of troubleshooting steps. The application update set of troubleshooting steps may include latest version number of the application and direct the user to find the current version of the application and compare. If the numbers are different, the application update set of troubleshooting steps may direct the user to update the application via the Operating System specific instructions. As a further example, the troubleshooting system 420 may retrieve full size browser troubleshooting steps. The full-size browser troubleshooting steps may include instructions to a user that the user needs to use a full-size computer browser to reset their password rather than a mobile browser or mobile application. In this example, the machine learning model might learn that frustrated clicking around specific parts of the mobile application settings is frequently followed by a call center call or an online password reset.

In block 120, the troubleshooting system 420 may generate a third message including the one or more troubleshooting steps and a feedback request on an effectiveness of the one or more troubleshooting steps. For example, the feedback request may be a binary request (e.g., Yes vs. No or thumbs up vs. thumbs down).

In block 122, the troubleshooting system 420 may transmit the third message to the user. The third message may be sent via an email, a push notification, a text message, a chat message, or combinations thereof.

In block 124, the troubleshooting system 420 may receive feedback from the user in response to the feedback request. In some embodiments, the feedback is a binary indication on whether the one or more troubleshooting steps resolved the one or more issues.

In block 126, the troubleshooting system 420 may determine whether the feedback is negative. For example, if the troubleshooting system 420 receives feedback with a thumbs down or a no, the troubleshooting system 420 may determine that the feedback is negative. Conversely, if the troubleshooting system 420 receives feedback with a thumbs up or a yes, the troubleshooting system 420 may determine that the feedback not negative.

In block 128, the troubleshooting system 420 may transmit a fourth message to a representative requesting the representative call the user when the troubleshooting system 420 determines the feedback is negative.

In some embodiments, the troubleshooting system 420 may retrieve social media data from a social media account associated with the system, determine, using a second machine learning model, whether the social media data indicates a negative sentiment regarding the one or more issues, and send a fifth message to the representative to call the user when the troubleshooting system 420 determines that the social media data indicates the negative sentiment regarding the one or more issues. The fifth message may be sent via an email, a push notification, a text message, a chat message, or combinations thereof.

In some embodiments, the troubleshooting system 420 may generate a webpage for the user. Additionally, receiving the feedback from the user (in block 124) may include receiving user input at the webpage indicating that the one or more troubleshooting steps did not result the one or more issues. In some embodiments, the troubleshooting system 420 may send a fifth message to the representative to call the user. The fifth message may be sent via an email, a push notification, a text message, a chat message, or combinations thereof.

In some embodiments, the troubleshooting system 420 may send the feedback to the first machine learning model to train the first machine learning model.

Figure 2:
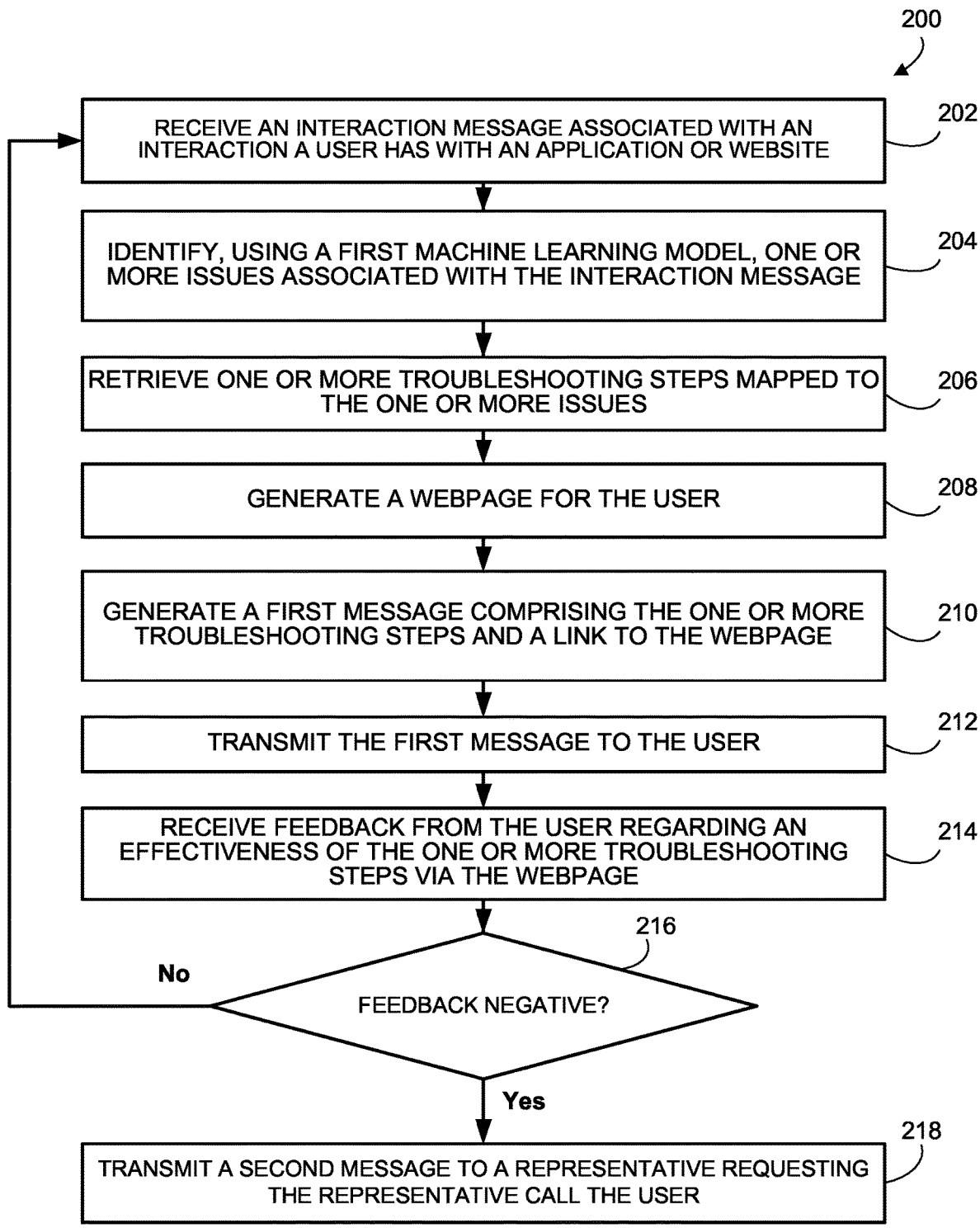
FIG. 2 is a flow diagram illustrating an exemplary method for identifying and troubleshooting customer issues to preempt customer calls, in accordance with certain embodiments of the disclosed technology.

FIG. 2 is a flow diagram illustrating an exemplary method 200 for method for dynamically routing customer service calls, in accordance with certain embodiments of the disclosed technology. The steps of method 200 may be performed by one or more components of the system 500 (e.g., troubleshooting system 420 or web server 510 of user contact system 508 or user device 502), as described in more detail with respect to FIGS. 4 and 5.

Method 200 of FIG. 2 is similar to method 100 of FIGS. 1A and 1B, except that method 200 may not include blocks 106, 108, 110, 112, 114, 116, 120, and 124 of method 100. The descriptions of blocks 202, 204, 206, 212, 216, and 218 in method 200 are similar to the respective descriptions of blocks 102, 104, 118, 122, 126, and 128 in method 100 and are not repeated herein for brevity. However, blocks 208, 210, and 214 are different from blocks in method 100 and are described below.

In block 208, the troubleshooting system 420 (or web server 510) may generate a webpage having a graphical user interface (GUI) for the user. The webpage may include personal information about the user's account, identified one or more issues, and resolution status. The troubleshooting system may prioritize and place critical issues in a prominent position (e.g., at the top or top left of the GUI) with less critical issues placed at a less prominent position (e.g., at the bottom or bottom right of the GUI). The webpage may also include at least one button or link for receiving a feedback request from the user regarding the effectiveness of the one or more troubleshooting steps. For example, the feedback request may be a binary request (e.g., Yes vs. No or thumbs up symbol/icon vs. thumbs down symbol/icon) or may be a text box for receiving more customized feedback. These buttons or links may be apart of (e.g., embedded in) or next to each position of the one or more issues in a list. The buttons or links may automatically change color or change size based on which issue they are associated with and in response to whether a certain button or link was selected. For example, a thumbs up icon/button for an issue determined to be the highest priority issue may be the largest in comparison to the thumbs up icon/button for other issues or may have red in the icon/button whereas the other icon/buttons associated with other issues do not. In another example, the large thumbs up icon/button may decrease in size along with a thumbs down icon/button associated with the same high priority issue when selected.

In block 210, the troubleshooting system 420 may generate a first message that includes the one or more troubleshooting steps and a link to the webpage. In some embodiments, the first message also includes instructions for using the webpage.

In block 214, the troubleshooting system 420 may receive feedback from the user regarding an effectiveness of the one or more troubleshooting steps via the webpage. For example, a user may click a link on the webpage corresponding to "no" indicating that the one or more troubleshooting steps did not resolve their one or more issues.

Figure 3:
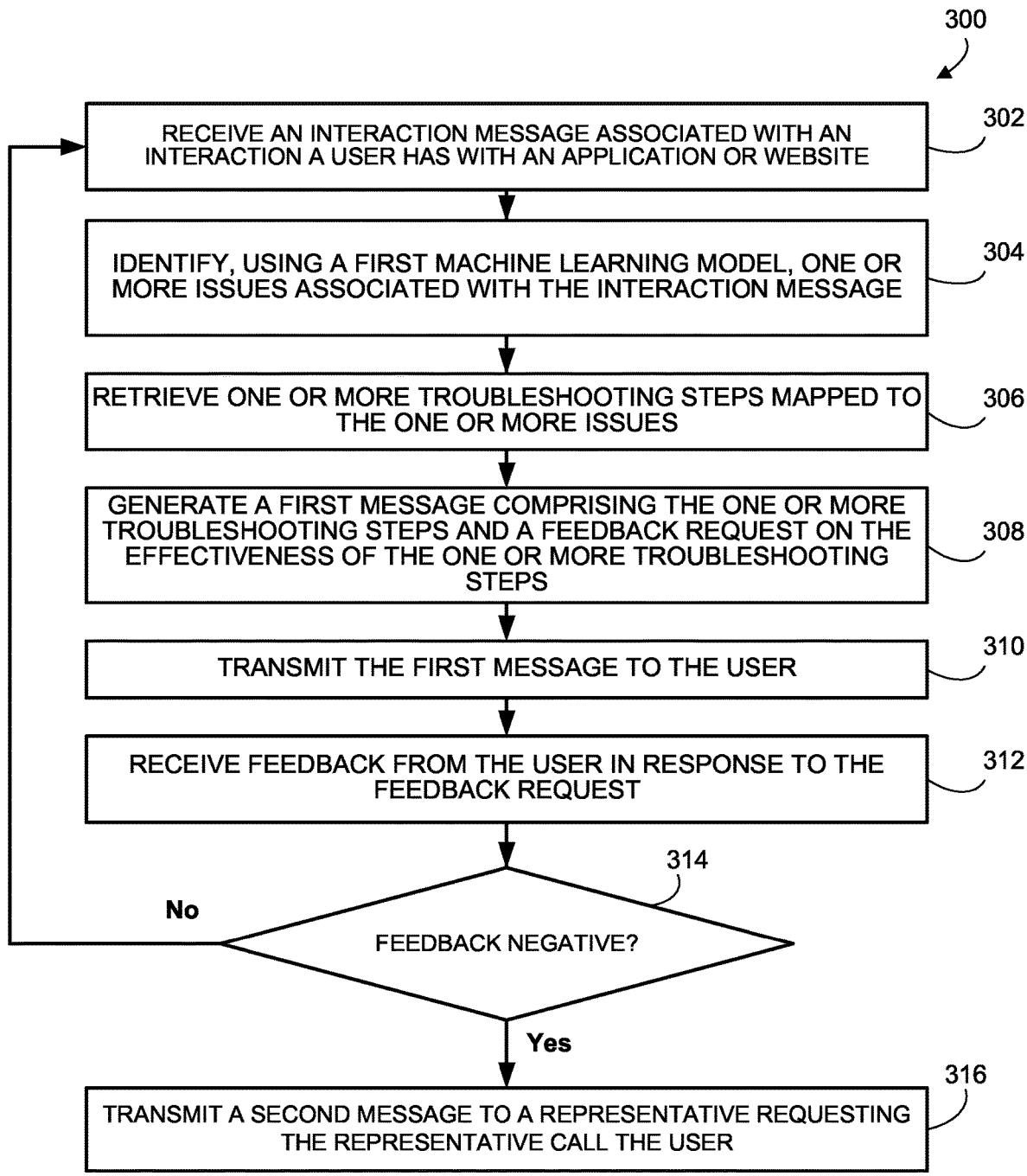
FIG. 3 is a flow diagram illustrating an exemplary method for identifying and troubleshooting customer issues to preempt customer calls, in accordance with certain embodiments of the disclosed technology.

FIG. 3 is a flow diagram illustrating an exemplary method 300 for method for dynamically routing customer service calls, in accordance with certain embodiments of the disclosed technology. The steps of method 300 may be performed by one or more components of the system 500 (e.g., troubleshooting system 420 or web server 510 of user contact system 508 or user device 502), as described in more detail with respect to FIGS. 4 and 5.

Method 300 of FIG. 3 is similar to method 200 of FIG. 2, except that method 200 may not include block 208 and different versions of block 210 and 214 from method 200. The descriptions of blocks 302, 304, 306, 310, 314, and 316 in method 300 are similar to the respective descriptions of blocks 202, 204, 206, 212, 216, and 218 of method 200 and are not repeated herein for brevity. However, blocks 308 and 312 are slightly different from the blocks in method 200 and are described below.

In block 308, the troubleshooting system 420 may generate a first message that includes the one or more troubleshooting steps and a feedback request on the effectiveness of the one or more troubleshooting steps. For example, the feedback request may be a binary request (e.g., Yes vs. No or thumbs up vs. thumbs down).

In block 312, the troubleshooting system 420 may receive feedback from the user regarding an effectiveness of the one or more troubleshooting steps in response to the feedback request. For example, a user may click a link in an email message corresponding to "no" indicating that the one or more troubleshooting steps did not resolve their one or more issues.

Figure 4:
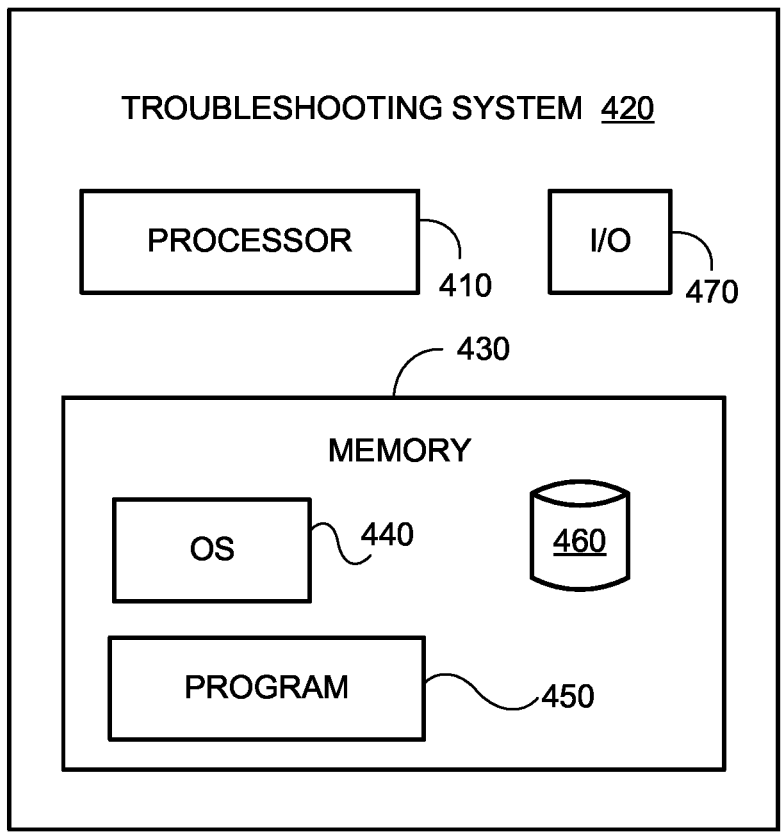
FIG. 4 is a block diagram of an example troubleshooting system used to identify and troubleshoot customer issues to preempt customer calls, according to an example implementation of the disclosed technology.
Figure 5:
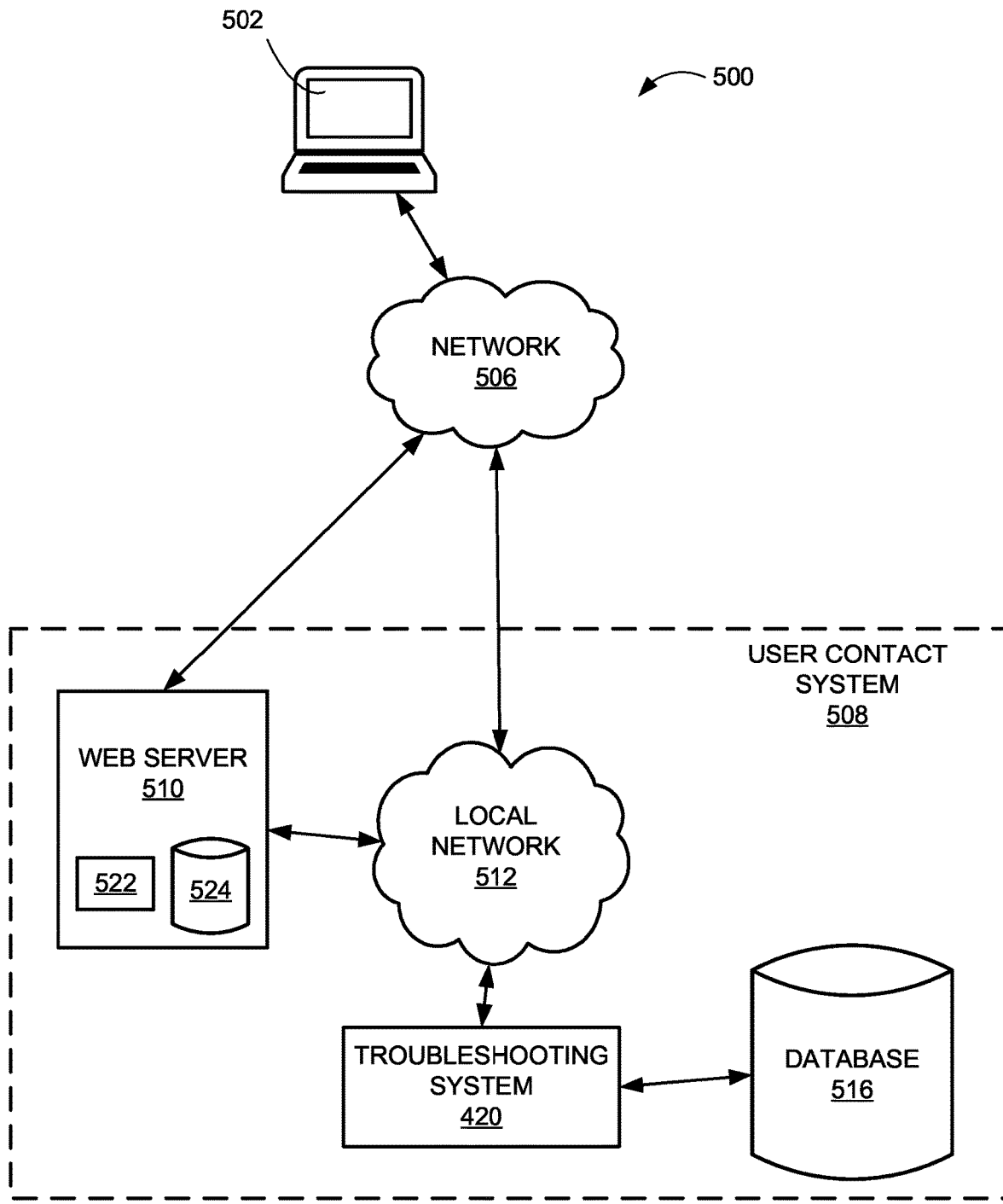
FIG. 5 is a block diagram of an example system that may be used to identify and troubleshoot customer issues to preempt customer calls, according to an example implementation of the disclosed technology.

FIG. 4 is a block diagram of an example troubleshooting system used to identify and troubleshoot customer issues to preempt customer calls, according to an example implementation of the disclosed technology. According to some embodiments, the user device 502 and web server 510, as depicted in FIG. 5 and described below, may have a similar structure and components that are similar to those described with respect to troubleshooting system 420 shown in FIG. 4. As shown, the troubleshooting system 420 may include a processor 410, an input/output ("I/O") device 470, a memory 430 containing an operating system ("OS") 440 and a program 450. In certain example implementations, the troubleshooting system 420 may be a single server or may be configured as a distributed computer system including multiple servers or computers that interoperate to perform one or more of the processes and functionalities associated with the disclosed embodiments. In some embodiments, troubleshooting system 420 may be one or more servers from a serverless or scaling server system. In some embodiments, the troubleshooting system 420 may further include a peripheral interface, a transceiver, a mobile network interface in communication with the processor 410, a bus configured to facilitate communication between the various components of the troubleshooting system 420, and a power source configured to power one or more components of the troubleshooting system 420.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 410 to communicate with other devices via wired or wireless networks, whether local or wide area, private or public, as known in the art. A power source may be configured to provide an appropriate alternating current (AC) or direct current (DC) to power components.

The processor 410 may include one or more of a microprocessor, microcontroller, digital signal processor, co-processor or the like or combinations thereof capable of executing stored instructions and operating upon stored data. The memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 430.

The processor 410 may be one or more known processing devices, such as, but not limited to, a microprocessor from the Pentium™ family manufactured by Intel™ or the Turion™ family manufactured by AMD™. The processor 410 may constitute a single core or multiple core processor that executes parallel processes simultaneously. For example, the processor 410 may be a single core processor that is configured with virtual processing technologies. In certain embodiments, the processor 410 may use logical processors to simultaneously execute and control multiple processes. The processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the troubleshooting system 420 may include one or more storage devices configured to store information used by the processor 410 (or other components) to perform certain functions related to the disclosed embodiments. In one example, the troubleshooting system 420 may include the memory 430 that includes instructions to enable the processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the troubleshooting system 420 may include a memory 430 that includes instructions that, when executed by the processor 410, perform one or more processes consistent with the functionalities disclosed herein. Methods, systems, and articles of manufacture consistent with disclosed embodiments are not limited to separate programs or computers configured to perform dedicated tasks. For example, the troubleshooting system 420 may include the memory 430 that may include one or more programs 450 to perform one or more functions of the disclosed embodiments. For example, in some embodiments, the troubleshooting system 420 may additionally manage dialogue and/or other interactions with the customer via a program 450.

The processor 410 may execute one or more programs located remotely from the troubleshooting system 420. For example, the troubleshooting system 420 may access one or more remote programs that, when executed, perform functions related to disclosed embodiments.

The memory 430 may include one or more memory devices that store data and instructions used to perform one or more features of the disclosed embodiments. The memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 430 may include software components that, when executed by the processor 410, perform one or more processes consistent with the disclosed embodiments. In some embodiments, the memory 430 may include a troubleshooting database 460 for storing related data to enable the troubleshooting system 420 to perform one or more of the processes and functionalities associated with the disclosed embodiments.

The troubleshooting database 460 may include stored data relating to one or more issues, users, and mapping data of the one or more issues to one or more troubleshooting steps (e.g., list or spreadsheets linking or mapping one or more issues to one or more trouble shooting steps). According to some embodiments, the functions provided by the troubleshooting database 460 may also be provided by a database that is external to the troubleshooting system 420, such as the database 516 as shown in FIG. 5.

The troubleshooting system 420 may also be communicatively connected to one or more memory devices (e.g., databases) locally or through a network. The remote memory devices may be configured to store information and may be accessed and/or managed by the troubleshooting system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The troubleshooting system 420 may also include one or more I/O devices 470 that may comprise one or more interfaces for receiving signals or input from devices and providing signals or output to one or more devices that allow data to be received and/or transmitted by the troubleshooting system 420. For example, the troubleshooting system 420 may include interface components, which may provide interfaces to one or more input devices, such as one or more keyboards, mouse devices, touch screens, track pads, trackballs, scroll wheels, digital cameras, microphones, sensors, and the like, that enable the troubleshooting system 420 to receive data from a user (such as, for example, via the user device 502).

In example embodiments of the disclosed technology, the troubleshooting system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the troubleshooting system 420 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the troubleshooting system 420 may include a greater or lesser number of components than those illustrated.

FIG. 5 is a block diagram of an example system that may be used to identify and troubleshoot customer issues to preempt customer calls, according to an example implementation of the disclosed technology. The components and arrangements shown in FIG. 5 are not intended to limit the disclosed embodiments as the components used to implement the disclosed processes and features may vary. As shown, user contact system 508 may interact with a user device 502 via a network 506. In certain example implementations, the user contact system 508 may include a local network 512, a troubleshooting system 420, a web server 510, and a database 516.

In some embodiments, a user may operate the user device 502. The user device 502 can include one or more of a mobile device, smart phone, general purpose computer, tablet computer, laptop computer, telephone, PSTN landline, smart wearable device, voice command device, other mobile computing device, or any other device capable of communicating with the network 5506 and ultimately communicating with one or more components of the ATM management system 508. In some embodiments, the user device 502 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the user contact system 508. According to some embodiments, the user device 502 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 506 may be of any suitable type, including individual connections via the internet such as cellular or WiFi networks. In some embodiments, the network 506 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 506 may include any type of computer networking arrangement used to exchange data. For example, the network 506 may be the Internet, a private data network, virtual private network using a public network, and/or other suitable connection(s) that enable(s) components in the system 500 environment to send and receive information between the components of the system 500. The network 506 may also include a public switched telephone network ("PSTN") and/or a wireless network.

The user contact system 508 may be associated with and optionally controlled by one or more entities such as a business, corporation, individual, partnership, or any other entity that provides one or more of goods, services, and consultations to individuals such as customers. In some embodiments, the user contact system 508 may be controlled by a third party on behalf of another business, corporation, individual, partnership. The user contact system 508 may include one or more servers and computer systems for performing one or more functions associated with products and/or services that the organization provides.

Web server 510 may include a computer system configured to generate and provide one or more websites accessible to customers, as well as any other individuals involved in access system 508's normal operations. Web server 510 may include a computer system configured to receive communications from user device 502 via for example, a mobile application, a chat program, an instant messaging program, a voice-to-text program, an SMS message, email, or any other type or format of written or electronic communication. Web server 510 may have one or more processors 522 and one or more web server databases 524, which may be any suitable repository of website data. Information stored in web server 510 may be accessed (e.g., retrieved, updated, and added to) via local network 512 and/or network 506 by one or more devices or systems (e.g., troubleshooting system 420) of system 500. In some embodiments, web server 510 may host websites or applications that may be accessed by the user device 502. For example, web server 510 may host a financial service provider website that a user device may access by providing an attempted login that are authenticated by the troubleshooting system 420. According to some embodiments, web server 510 may include software tools, similar to those described with respect to user device 502 above, that may allow web server 510 to obtain network identification data from user device 502.

The local network 512 may include any type of computer networking arrangement used to exchange data in a localized area, such as WiFi, Bluetooth™ Ethernet, and other suitable network connections that enable components of the user contact system 508 to interact with one another and to connect to the network 506 for interacting with components in the system 500 environment. In some embodiments, the local network 412 may include an interface for communicating with or linking to the network 506. In other embodiments, certain components of the user contact system 508 may communicate via the network 506, without a separate local network 506.

In accordance with certain example implementations of the disclosed technology, the user contact system 508 may include one or more computer systems configured to compile data from a plurality of sources the troubleshooting system 420, web server 510, and/or the database 516. The troubleshooting system 420 may correlate compiled data, analyze the compiled data, arrange the compiled data, generate derived data based on the compiled data, and store the compiled and derived data in a database such as the database 516. According to some embodiments, the database 516 may be a database associated with an organization and/or a related entity that stores a variety of information relating to customers, transactions, ATM, and business operations. The database 516 may also serve as a back-up storage device and may contain data and information that is also stored on, for example, database 460, as discussed with reference to FIG. 4.

Although the preceding description describes various functions of a web server 510, a troubleshooting system 420, and a database 516, in some embodiments, some or all of these functions may be carried out by a single computing device or a plurality of computing devices in a (cloud) serverless system.

Exemplary Use Case

A user using a mobile banking application on his mobile device (e.g., user device 502) attempts to conduct a transaction such as a money transfer. However, the mobile application may not be working for the user for a variety of reasons (e.g., a bug, not enough money in the source account, user selected the wrong transfer option). Regardless, the user may repeatedly try to conduct the same transaction, which is recorded by the mobile banking application and sent to and received by one or more bank servers (e.g., troubleshooting system 420) as an interaction message. This interaction message may be stored by one or more bank servers (e.g., troubleshooting system 420) in one or more databases such as databases 460 and/or 516.

The one or more bank servers (e.g., troubleshooting system 420) may identify, using a first (previously trained) machine learning model, one or more issues (e.g., user is unable to conduct a money transfer) associated with the interaction message in response to receiving the interaction message. In response to identifying the one or more issues, the one or more bank servers (e.g., troubleshooting system 420) may retrieve a list that includes the one or more troubleshooting steps mapped to the one or more issues. The one or more bank servers (e.g., troubleshooting system 420) may generate a first message that includes the one or more troubleshooting steps and a feedback request on the effectiveness of the one or more troubleshooting steps. The feedback request may contain two links or buttons. One button may contain the word "Yes" and the other button may contain the word "No." The one or more bank servers (e.g., troubleshooting system 420) may transmit the first message to the user via their mobile device (e.g., user device 502). Eventually, the one or more bank servers (e.g., troubleshooting system 420) may receive feedback (e.g., a reply message of "No" or a click on a link/button in the first message entitled "No") from the user via the mobile device (e.g., user device 502) in response to the feedback request. The one or more bank servers (e.g., troubleshooting system 420) may determine whether the feedback is negative which may include whether the user click the "Yes" or "No" button. If the one or more bank servers (e.g., troubleshooting system 420) determines that the feedback is negative, the one or more bank servers (e.g., troubleshooting system 420) may generate and transmit a second message to a call center representative requesting the call center representative call the user to attempt to help resolve the one or more issues. The one or more bank servers (e.g., troubleshooting system 420) may integrate with a call centers current call processing system, inserting the a "reach out" call into a center's queue and alerting the call center employee that their next call will be a "reach out" with the specified steps and issue instead of an incoming call. Alternatively, the one or more bank servers (e.g., troubleshooting system 420) may be a cloud based system that uses a queue management service such as Amazon's simple queue service (SQS). If the one or more bank servers (e.g., troubleshooting system 420) determines that the feedback is not negative, the one or more bank servers (e.g., troubleshooting system 420) may continue to monitor for interaction messages from the user and other users. In some cases, the one or more bank servers (e.g., troubleshooting system 420), may identify whether the one or more issues should be addressed with troubleshooting at this time. For example, if there is a regular or prescheduled maintenance occurring for or known glitch in the mobile banking application, the one or more bank servers (e.g., troubleshooting system 420) may postpone sending the troubleshooting steps to the mobile device (e.g., user device 502) or may generate an additional message to the user that the described troubleshooting should be postpone until the maintenance or glitch is resolved, to improve the user experience and efficiency.

In some examples, disclosed systems or methods may involve one or more of the following clauses:

Clause 1: A system comprising: one or more processors; and memory in communication with the one or more processors and storing instructions that are configured to cause the system to: receive an interaction message associated with an interaction a user has with an application or website, the interaction message comprising an error message or a repeated action message; identify, using a first machine learning model, one or more issues associated with the interaction message; update an occurrence rate based on identifying the one or more issues, the occurrence rate reflecting a percentage of interaction messages being associated with the one or more issues over a predetermined period; determine whether the occurrence rate exceeds a predetermined threshold; when the occurrence rate exceeds the predetermined threshold: generate a first message with information regarding the one or more issues and requesting a technical team to investigate and resolve the one or more issues; transmit the first message to the technical team; generate a second message for the user indicating that the technical team is working on the one or more issues; and transmit the second message to the user; when the occurrence rate does not exceed the predetermined threshold: retrieve one or more troubleshooting steps mapped to the one or more issues; generate a third message comprising the one or more troubleshooting steps and a feedback request on an effectiveness of the one or more troubleshooting steps; transmit the third message to the user; receive feedback from the user in response to the feedback request; determine whether the feedback is negative; and when the feedback is negative, transmit a fourth message to a representative requesting the representative call the user.

Clause 2: The system of clause 1, wherein the feedback is a binary indication on whether the one or more troubleshooting steps resolved the one or more issues.

Clause 3: The system of clause 1, wherein the first message is sent via an email, a push notification, a text message, a chat message, or combinations thereof.

Clause 4: The system of clause 1, wherein the second message is sent via an email, a push notification, a text message, a chat message, or combinations thereof.

Clause 5: The system of clause 1, wherein the third message is sent via an email, a push notification, a text message, a chat message, or combinations thereof.

Clause 6: The system of clause 1, wherein the first machine learning model is a neural network.

Clause 7: The system of clause 1, wherein the memory stores further instructions that are further configured to cause the system to: retrieve social media data from a social media account associated with the system; determine, using a second machine learning model, whether the social media data indicates a negative sentiment regarding the one or more issues; and when the social media data indicates the negative sentiment regarding the one or more issues, send a fifth message to the representative to call the user.

Clause 8: The system of clause 1, wherein: the memory stores further instructions that are further configured to cause the system to generate a webpage for the user; and receiving feedback from the user comprises receiving user input at the webpage indicating that the one or more troubleshooting steps did not resolve the one or more issues.

Clause 9: The system of clause 8, wherein the memory stores further instructions that are further configured to cause the system to send a fifth message to the representative to call the user.

Clause 10: The system of clause 1, wherein the memory stores further instructions that are further configured to cause the system to send the feedback to the first machine learning model to train the first machine learning model.

Clause 11: A system, comprising: one or more processors; and memory in communication with the one or more processors and storing instructions that are configured to cause the system to: receive an interaction message associated with an interaction a user has with an application or website, the interaction message comprising an error message or a repeated action message; identify, using a first machine learning model, one or more issues associated with the interaction message; retrieve one or more troubleshooting steps mapped to the one or more issues; generate a webpage for the user; generate a first message comprising the one or more troubleshooting steps and a link to the webpage; transmit the first message to the user; receive feedback from the user regarding an effectiveness of the one or more troubleshooting steps via the webpage; determine whether the feedback is negative; and when the feedback is negative, transmit a second message to a representative requesting a representative call the user.

Clause 12: The system of clause 11, wherein the feedback is a binary indication on whether the one or more troubleshooting steps resolved the one or more issues.

Clause 13: The system of clause 11, wherein the first message is sent via an email, a push notification, a text message, a chat message, or combinations thereof.

Clause 14: The system of clause 11, wherein the second message is sent via an email, a push notification, a text message, a chat message, or combinations thereof.

Clause 15: The system of clause 11, wherein the first machine learning model is a neural network.

Clause 16: The system of clause 11, wherein the memory stores further instructions that are further configured to cause the system to: retrieve social media data from a social media account associated with the system; determine, using a second machine learning model, whether the social media data indicates a negative sentiment regarding the one or more issues; and when the social media data indicates the negative sentiment regarding the one or more issues, send a third message to the representative to call the user.

Clause 17: The system of clause 11, wherein the memory stores further instructions that are further configured to cause the system to: update an occurrence rate based on identifying the one or more issues, the occurrence rate reflecting a percentage of interaction messages being associated with the one or more issues over a predetermined period; determine whether the occurrence rate exceeds a predetermined threshold; when the occurrence rate exceeds the predetermined threshold: store a flag in a database indicating the user has the one or more issues; generate a third message with information regarding the one or more issues requesting a technical team to investigate and resolve the one or more issues; transmit the third message to the technical team; generate a fourth message for the user indicating that the technical team is working on the one or more issues; and transmit the fourth message to the user.

Clause 18: A system, comprising: one or more processors; and memory in communication with the one or more processors and storing instructions that are configured to cause the system to: receive an interaction message associated with an interaction a user has with an application or website, the interaction message comprising an error message or a repeated action message; identify, using a first machine learning model, one or more issues associated with the interaction message; retrieve one or more troubleshooting steps mapped to the one or more issues; generate a first message comprising the one or more troubleshooting steps and a feedback request on an effectiveness of the one or more troubleshooting steps; transmit the first message to the user; receive feedback from the user in response to the feedback request; determine whether the feedback is negative; and when the feedback is negative, transmit a second message to a representative requesting the representative call the user.

Clause 19: The system of clause 18, wherein the memory stores further instructions that are further configured to cause the system to: update an occurrence rate based on identifying the one or more issues, the occurrence rate reflecting a percentage of interaction messages being associated with the one or more issues over a predetermined period; determine whether the occurrence rate exceeds a predetermined threshold; when the occurrence rate exceeds the predetermined threshold: store a flag in a database indicating the user has the one or more issues; generate a second message with information regarding the one or more issues requesting a technical team to investigate and resolve the one or more issues; transmit the second message to the technical team; generate a third message for the user indicating that the technical team is working on the one or more issues; and transmit the third message to the user.

Clause 20: The system of clause 18, wherein the memory stores further instructions that are further configured to cause the system to: retrieve social media data from a social media account associated with the system; determine, using a second machine learning model, whether the social media data indicates a negative sentiment regarding the one or more issues; and when the social media data indicates the negative sentiment regarding the one or more issues, generate and send a second message to the representative to call the user.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more processors; and
memory in communication with the one or more processors and storing instructions that are configured to cause the system to:
receive an interaction message that is generated based on an interaction a user has with an application or website, the interaction message comprising a repeated action message, wherein the interaction message represents a malfunction of the application or website;
identify, using a first machine learning model, one or more issues associated with the interaction message, wherein the first machine learning model comprises a neural network that is configured to predict issues associated with non-labeled interaction messages by having been trained using a set of training interaction messages that are labeled with one or more associated issues;
update an occurrence rate based on identifying the one or more issues, the occurrence rate reflecting a percentage of interaction messages being associated with the one or more issues over a predetermined period;
determine whether the occurrence rate exceeds a predetermined threshold;
when the occurrence rate exceeds the predetermined threshold:
generate a first message with information regarding the one or more issues and requesting a technical team to investigate and resolve the one or more issues;
transmit the first message to the technical team;
generate a second message for the user indicating that the technical team is working on the one or more issues; and
transmit the second message to the user;
when the occurrence rate does not exceed the predetermined threshold:
retrieve one or more troubleshooting steps mapped to the one or more issues;
generate a third message comprising the one or more troubleshooting steps and a feedback request on an effectiveness of the one or more troubleshooting steps;
transmit the third message to the user;
receive feedback from the user in response to the feedback request;
determine whether the feedback is negative, wherein negative feedback comprises an indication that the one or more troubleshooting steps did not resolve the one or more issues;
when the feedback is negative, transmit a fourth message to a representative requesting the representative call the user; and
send the feedback to the first machine learning model for use in further training the first machine learning model.

2. The system of claim 1, wherein the feedback is a binary indication on whether the one or more troubleshooting steps resolved the one or more issues.

3. The system of claim 1, wherein the first message is sent via an email, a push notification, a text message, a chat message, or combinations thereof.

4. The system of claim 1, wherein the second message is sent via an email, a push notification, a text message, a chat message, or combinations thereof.

5. The system of claim 1, wherein the third message is sent via an email, a push notification, a text message, a chat message, or combinations thereof.

6. The system of claim 1, wherein:
the memory stores further instructions that are further configured to cause the system to generate a webpage for the user; and
receiving feedback from the user comprises receiving user input at the webpage indicating that the one or more troubleshooting steps did not resolve the one or more issues.

7. The system of claim 6, wherein the memory stores further instructions that are further configured to cause the system to send a fifth message to the representative to call the user.

8. A system, comprising:
one or more processors; and
memory in communication with the one or more processors and storing instructions that are configured to cause the system to:
receive an interaction message that is generated based on an interaction a user has with an application or website, the interaction message comprising an error message or a repeated action message, wherein the interaction message represents a malfunction of the application or website;
identify, using a first machine learning model, one or more issues associated with the interaction message, wherein the first machine learning model comprises a neural network that is configured to predict issues associated with non-labeled interaction messages by having been trained using a set of training interaction messages that are labeled with one or more associated issues;
retrieve one or more troubleshooting steps mapped to the one or more issues;
generate a webpage for the user;
generate a first message comprising the one or more troubleshooting steps and a link to the webpage;
transmit the first message to the user;
receive feedback from the user regarding an effectiveness of the one or more troubleshooting steps via the webpage;
determine whether the feedback is negative, wherein negative feedback comprises an indication that the one or more troubleshooting steps did not resolve the one or more issues;
when the feedback is negative, transmit a second message to a representative requesting a representative call the user; and
send the feedback to the first machine learning model for use in further training the first machine learning model.

9. The system of claim 8, wherein the feedback is a binary indication on whether the one or more troubleshooting steps resolved the one or more issues.

10. The system of claim 8, wherein the first message is sent via an email, a push notification, a text message, a chat message, or combinations thereof.

11. The system of claim 8, wherein the second message is sent via an email, a push notification, a text message, a chat message, or combinations thereof.

12. The system of claim 8, wherein the memory stores further instructions that are further configured to cause the system to:
update an occurrence rate based on identifying the one or more issues, the occurrence rate reflecting a percentage of interaction messages being associated with the one or more issues over a predetermined period;
determine whether the occurrence rate exceeds a predetermined threshold;
when the occurrence rate exceeds the predetermined threshold:
store a flag in a database indicating the user has the one or more issues;
generate a third message with information regarding the one or more issues requesting a technical team to investigate and resolve the one or more issues;
transmit the third message to the technical team;
generate a fourth message for the user indicating that the technical team is working on the one or more issues; and
transmit the fourth message to the user.

13. A system, comprising:
one or more processors; and
memory in communication with the one or more processors and storing instructions that are configured to cause the system to:
receive an interaction message that is generated based on an interaction a user has with an application or website, the interaction message comprising an error message or a repeated action message, wherein the interaction message represents a malfunction of the application or website;
identify, using a first machine learning model, one or more issues associated with the interaction message, wherein the first machine learning model comprises a neural network that is configured to predict issues associated with non-labeled interaction messages by having been trained using a set of training interaction messages that are labeled with one or more associated issues;
retrieve one or more troubleshooting steps mapped to the one or more issues;
generate a first message comprising the one or more troubleshooting steps and a feedback request on an effectiveness of the one or more troubleshooting steps;
transmit the first message to the user;
receive feedback from the user in response to the feedback request;
determine whether the feedback is negative, wherein negative feedback comprises an indication that the one or more troubleshooting steps did not resolve the one or more issues;
when the feedback is negative, transmit a second message to a representative requesting the representative call the user; and
send the feedback to the first machine learning model for use in further training the first machine learning model.

14. The system of claim 13, wherein the memory stores further instructions that are further configured to cause the system to:
update an occurrence rate based on identifying the one or more issues, the occurrence rate reflecting a percentage of interaction messages being associated with the one or more issues over a predetermined period;
determine whether the occurrence rate exceeds a predetermined threshold;
when the occurrence rate exceeds the predetermined threshold:
store a flag in a database indicating the user has the one or more issues;
generate a second message with information regarding the one or more issues requesting a technical team to investigate and resolve the one or more issues;
transmit the second message to the technical team;
generate a third message for the user indicating that the technical team is working on the one or more issues; and
transmit the third message to the user.

15. The system of claim 1, wherein the repeated action message is generated in response to the user repeatedly performing a same action in association with the application or website.

16. The system of claim 8, wherein the repeated action message is generated in response to the user repeatedly performing a same action in association with the application or website.

17. The system of claim 15, wherein the repeated action message is generated by a mobile application in response to the user clicking around specific parts of a mobile application settings.

18. The system of claim 1, wherein the memory stores further instructions that are further configured to cause the system to:
retrieve social media data from a social media account associated with the system;
determine, using a second machine learning model, that the social media data indicates a negative sentiment regarding the one or more issues; and
when the social media data indicates the negative sentiment regarding the one or more issues, send a fifth message to the representative to call the user.

19. The system of claim 8, wherein the memory stores further instructions that are further configured to cause the system to:
retrieve social media data from a social media account associated with the system;
determine, using a second machine learning model, that the social media data indicates a negative sentiment regarding the one or more issues; and
when the social media data indicates the negative sentiment regarding the one or more issues, send a third message to the representative to call the user.

20. The system of claim 13, wherein:
the memory stores further instructions that are further configured to cause the system to generate a webpage for the user; and
receiving feedback from the user comprises receiving a user input at the webpage.

\* \* \* \* \*